United States Patent [19]

Seki et al.

[11] Patent Number: 5,583,390
[45] Date of Patent: Dec. 10, 1996

[54] VIBRATION WAVE DRIVEN APPARATUS

[75] Inventors: Hiroyuki Seki, Urawa; Atsushi Kimura; Takashi Maeno, both of Yokohama, all of Japan

[73] Assignee: Canon Kabushiki Kaisha, Tokyo, Japan

[21] Appl. No.: 273,775

[22] Filed: Jul. 12, 1994

Related U.S. Application Data

[63] Continuation of Ser. No. 978,048, Nov. 18, 1992, abandoned, which is a continuation of Ser. No. 626,219, Dec. 12, 1990, abandoned.

[30] Foreign Application Priority Data

Dec. 12, 1989 [JP] Japan ................. 1-322021

[51] Int. Cl.$^6$ ........................ H01L 41/08
[52] U.S. Cl. ........................ 310/323
[58] Field of Search ........................ 310/323, 328

[56] References Cited

U.S. PATENT DOCUMENTS

| 4,580,073 | 4/1986 | Okumura et al. | 310/329 |
|---|---|---|---|
| 4,672,256 | 6/1987 | Okuno et al. | 310/328 X |
| 4,692,652 | 9/1987 | Seki et al. | 310/323 |
| 4,723,129 | 2/1988 | Endo et al. | 346/1.1 |
| 4,740,796 | 4/1988 | Endo et al. | 346/1.1 |
| 4,786,836 | 11/1988 | Tokushima | 310/323 |
| 4,810,923 | 3/1989 | Tsukimoto et al. | 310/323 |
| 4,978,882 | 12/1990 | Kitani | 310/328 |

FOREIGN PATENT DOCUMENTS

| 0169297 | 1/1986 | European Pat. Off. |  |
|---|---|---|---|
| 0435496 | 7/1991 | European Pat. Off. |  |
| 3415628 | 10/1984 | Germany . |  |
| 0018371 | 1/1986 | Japan | 310/323 |
| 0224880 | 10/1986 | Japan | 310/323 |
| 62-077969 | 9/1987 | Japan . |  |
| 0213480 | 9/1988 | Japan | 310/323 |
| 0294273 | 11/1988 | Japan | 310/323 |
| 0126180 | 5/1989 | Japan | 310/323 |
| 0117669 | 5/1989 | Japan | 310/323 |
| 0268465 | 10/1989 | Japan | 310/323 |
| 0321879 | 12/1989 | Japan | 310/323 |
| 2174554 | 11/1986 | United Kingdom . |  |

*Primary Examiner*—Mark G. Budd
*Attorney, Agent, or Firm*—Fitzpatrick, Cella, Harper & Scinto

[57] ABSTRACT

In a vibration wave driven motor, when the radius of the arcuate portions and the length of the straight portions of a track type resilient member of an elliptical shape having straight portions and arcuate portions are (R) and (L), respectively, the ratio (R/L) is made equal to or greater than a particular value, whereby the resonance frequencies of two standing waves can be made coincident with each other and the torsion component of the straight portions can be reduced or the direction of the torsion can be made uniform with a result that the driving characteristic in the straight portions can be improved and also the electrode pattern of a piezo-electric element can be simplified.

33 Claims, 18 Drawing Sheets

DEVIATION
1. -0.6
2. -0.4
3. -0.2
4. 0
5. 0.2
6. 0.4
7. 0.6
8. 0.8
9. 1.0

DEVIATION
1. -0.6
2. -0.4
3. -0.2
4. 0
5. 0.2
6. 0.4
7. 0.6
8. 0.8
9. 1.0

DEVIATION
1. −0.6
2. −0.4
3. −0.2
4. 0
5. 0.2
6. 0.4
7. 0.6
8. 0.8
9. 1.0

R=5mm
L=58mm

DEVIATION
1. -1.0
2. -0.8
3. -0.6
4. -0.4
5. -0.2
6. 0
7. 0.2
8. 0.4
9. 0.6
10. 0.8
11. 1.0

DEVIATION
1. 1.0
2. -0.8
3. -0.6
4. -0.4
5. -0.2
6. 0
7. 0.2
8. 0.4
9. 0.6
10. 0.8
11. 1.0

DEVIATION
1. 1.0
2. -0.8
3. -0.6
4. -0.4
5. -0.2
6. 0
7. 0.2
8. 0.4
9. 0.6

DEVIATION
1. -0.8
2. -0.6
3. -0.4
4. -0.2
5. 0
6. 0.2
7. 0.4
8. 0.6
9. 0.8

DEVIATION
1. -0.6
2. -0.4
3. -0.2
4. 0
5. 0.2
6. 0.4
7. 0.6
8. 0.8

DEVIATION
1. −1.0
2. −0.8
3. −0.6
4. −0.4
5. −0.2
6. 0
7. 0.2
8. 0.4
9. 0.6
10. 0.8
11. 1.0 ic element 2, whereby a travelling vibration wave is formed in the resilient member 1, and the slider 11 brought into pressure contact with the resilient member 1 by the leaf spring 3 is subjected to a frictional force and a thrust is provided in the direction opposite to the direction in which the travelling vibration wave travels, so as to rectilinearly move the carriage 4. By changing over the phase difference between the AC voltages applied to the two driving piezo-electric element groups, the direction in which the travelling vibration wave travels can be changed over and thus, the carriage can be reciprocally moved in the directions indicated by arrow A.

VIBRATION WAVE DRIVEN APPARATUS

This application is a continuation of application Ser. No. 07/978,048 filed Nov. 18, 1992, which is a continuation of Ser. No. 07/626,219 filed Dec. 12, 1990, both now abandoned.

BACKGROUND OF THE INVENTION

1. Field of the Invention

This invention relates to a vibration wave driven motor, and in particular to a track type resilient member formed into an elliptical shape in which a travelling vibration wave is formed.

2. Related Background Art

Generally, in a vibration wave driven motor utilizing a travelling vibration wave, various shapes of a resilient member formed of a metal material such as stainless steel in which a travelling vibration wave is formed are chosen depending on the purposes of use thereof, and for example, a resilient member formed into an annular shape is known.

A vibration wave driven motor using an annular resilient member of this kind uses a vibration member having a piezo-electric element as an electro-mechanical energy conversion element adhesively secured to the back of the annular resilient member. The piezo-electric element has two piezo-electric element groups differing in polarity, the piezo-electric elements in each group have a positional phase difference of $\lambda/2$ therebetween, the two groups have a positional phase difference of $\lambda/4$ therebetween, and an AC electric fields having a time phase difference of 90° therebetween is applied to both piezo-electric element groups, whereby a travelling vibration wave of a wavelength $\lambda$ is formed in the resilient member by the synthesis of standing waves excited by the piezo-electric element groups.

The travelling vibration wave formed in the resilient member in this manner is utilized to frictionally drive the resilient member and a member which is in pressure contact with the resilient member, whereby the two members can be moved relative to each other.

FIG. 12 of the accompanying drawings is a pictorial perspective view of a linear motor using a track type resilient member formed into an elliptical shape comprising straight portions and arcuate portions. The reference numeral 1 designates a track type resilient member having a piezo-electric element 2 joined to the back thereof. The resilient member 1 is provided on a bottom plate 10 with a vibration insulating member 7 formed, for example, of felt being interposed therebetween. Guide bars 13 are fixed to the widthwise opposite sides of the bottom plate 10. The reference numeral 4 denotes a carriage which is a rectilinearly movable member. Bearings 12 through which the guide bars 13 extend are fixed to the opposite end portions of the carriage 4 so that the carriage 4 is reciprocally rectilinearly movable along the lengthwise direction of the guide bars 13 indicated by arrow A. A slider 11 is provided on the back of the carriage 4 in opposed relationship with one straight portion of the resilient member 1, and this slider 11 is pressed against the one straight portion by a leaf spring 3. AC electric fields having a time phase difference of 90° therebetween as described above are applied from a power source circuit, not shown, to two driving piezo-electric element groups forming the piezo-electric element 2, whereby a travelling vibration wave is formed in the resilient member 1, and the slider 11 brought into pressure contact with the resilient member 1 by the leaf spring 3 is The reason why the track type resilient member 1 is used in such a linear motor is that the area of contact thereof with the slider 11 can be made large and the rectilinear movement distance of the carriage 4 can be made long.

In such a vibration wave driven motor or apparatus, to form a travelling wave in the resilient member 1, it is required that the resonance frequencies of standing waves of the same order excited in the two driving piezo-electric element groups having a positional phase difference of $\lambda/4$ therebetween be substantially equal to each other.

FIGS. 13 and 14 of the accompany drawings show the states of vibration of the standing waves excited in the resilient member 1, and show the deformed state of the resilient member in a direction perpendicular to the plane thereof by contour lines. Solid lines are the lines of deviation zero (0), i.e., lines (node lines) which are the nodes of vibration. The amount of deviation has its maximum normalized as "1". The numbers of the lines correspond to the altitudes of the lines, and the line number 11 (FIG. 13) or 9 (FIG. 14) is the maximum deviation in the position direction (crest) and the line number 1 is the maximum deviation in the negative direction (valley).

FIGS. 15 and 16 of the accompanying drawings likewise show other standing wave modes, and correspondingly to FIGS. 15 and 16, the perspective views of the states of deviation thereof are shown in FIGS. 17 and 18 of the accompanying drawings, wherein broken lines indicate the shape of the resilient member in its non-vibrated state.

In the vibration member shown in FIGS. 17 and 18, the amplitude formed in the straight portions of the resilient member is divisionally formed on the inner side and the outer side of the resilient member and therefore, as regards the electrode patterns of the piezo-electric elements adhesively secured to the resilient member, with the torsion of the resilient member taken into account, the boundary between the electrodes is provided at the node position of each standing wave, as shown in FIG. 19 of the accompanying drawings, so that vibration may be excited efficiently.

In FIG. 19, the reference characters $2a_1$ and $2a_2$ designate one driving electrode group for exciting the standing wave mode of FIG. 15, the reference characters $2b_1$ and $2b_2$ denote the other driving electrode group for exciting the standing wave mode of FIG. 16, the reference character 2G designates and earthing electrode, and the reference characters 2Sa and 2Sb denote electrodes for a sensor for detecting the vibrated states of the standing wave modes excited by said two driving electrode groups. Each of these electrodes is polarization-processed as shown, and the direction of polarization thereof is the direction of the thickness of the piezo-electric element.

Now, in the linear motor as described above, to move the slider 11 smoothly, it is necessary that a travelling wave be formed finely (without amplitude irregularity) in the straight portions of the resilient member 1, and for that purpose, it is necessary that the torsion component during vibration in the straight portions of the resilient member 1 be little, or even if there is more or less torsion component, the direction of the torsion be always the same direction (for example, the vibration of the outer side be always great).

However, in the track type resilient member, it is difficult for the resonance frequencies of two standing waves to coincide with each other and the resilient member is formed by straight portions and arcuate portions. Therefore, as shown in FIGS. 13 to 18, even in the straight portions, a crest and a valley are divisionally formed on the inner side and the outer side of the resilient member. Thus, torsion is created in the straight portions of the resilient member and also the torsion component becomes great. This has led to the problem that the irregularity of the travelling wave becomes great.

Also, when a travelling wave is excited with the modes of FIGS. 13 and 14 superposed one upon the other, the deviation of the outer side of the right-hand straight portion differs in amplitude from location to location. Therefore, this provides irregularity of the travelling wave, thus resulting in a reduction in the feeding speed of the motor and a reduction in the efficiency of the motor as well as the generation of noise.

Further, as shown in FIG. 19, the electrode pattern is a complicated pattern in which the boundary is provided in accordance with the standing wave mode and therefore, great polarization strain remains in the boundary portion and this may lead to the possibility of the piezo-electric elements being destroyed during the polarizing work or during the driving of the motor, and if use is made of an electrode pattern which will avoid this, the electrode pattern will not agree with the standing wave mode and the efficiency of the motor will be reduced.

SUMMARY OF THE INVENTION

It is an object of the present invention to provide a vibration wave driven apparatus which eliminates the disadvantages peculiar to the above-described prior-art apparatus and in which the irregularity of the amplitude of a travelling vibration wave is small and which is good in efficiency and suffers little from the generation of noise.

It is another object of the present invention to provide a vibration wave driven motor or apparatus in which the electrode pattern of an electro-mechanical energy conversion element for driving a vibration member having straight portions and arcuate portions can be simplified.

It is still another object of the present invention to provide a vibration wave driven motor which is suitable as a drive source for the printing head of a bubble jet type printer.

The bubble jet type printer is a printer as disclosed, for example, in U.S. Pat. No. 4,723,129 or U.S. Pat. No. 4,740,796. Briefly describing it, it generically refers to a printer of the type in which at least one driving signal corresponding to recording information and providing a rapid temperature rise exceeding nucleate boiling is applied to an electro-thermal conversion member disposed correspondingly to a sheet or a liquid path in which liquid (ink) is retained, to thereby generate heat energy in the electro-thermal conversion member and cause film boiling on the heat-acting surface of a recording head with a result that a bubble in the liquid (ink) is formed correspondingly to said driving signal and by the growth and contraction of the bubble, the liquid (ink) is discharged through a discharge opening to thereby form at least one droplet which is blown against the sheet to thereby form a character.

Other objects of the present invention will become apparent from the following detailed description.

In the present invention, when the radius of the arcuate portions and the length of the straight portions of a track type resilient member of an elliptical shape having straight portions and arcuate portions are (R) and (L), respectively, the ratio (R/L) is made equal to or greater than a particular value, whereby the resonance frequencies of two standing waves can be made coincident with each other and the torsion component of the straight portions can be reduced or the direction of the torsion can be made uniform with a result that the driving characteristic in the straight portions can be improved and also the electrode pattern of a piezo-electric element can be simplified.

DESCRIPTION OF THE PREFERRED EMBODIMENTS

Figure 1A:
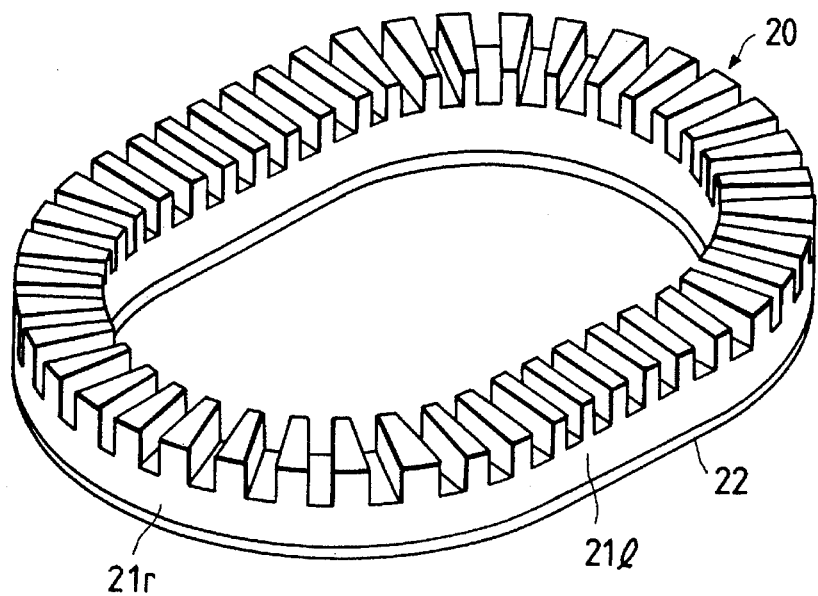
FIG. 1 shows an embodiment of a vibration wave driven motor according to the present invention, FIG. 1A being a perspective view of a resilient member, and FIG. 1B showing the electrode pattern of a piezo-electric element.

The present invention will hereinafter be described in detail with respect to some embodiments thereof shown in the drawings.

Figure 1B:
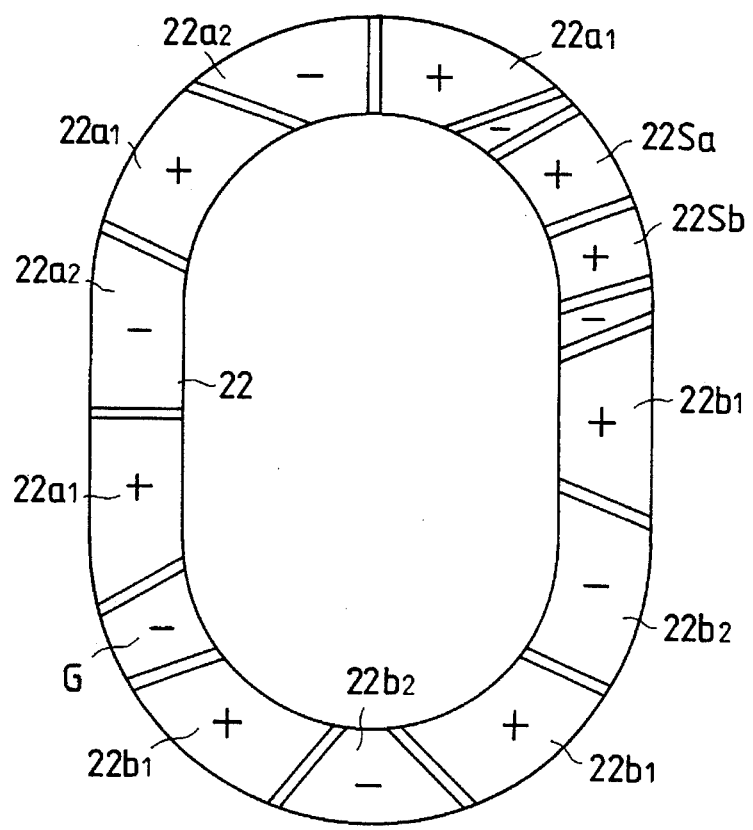
Figure 2:
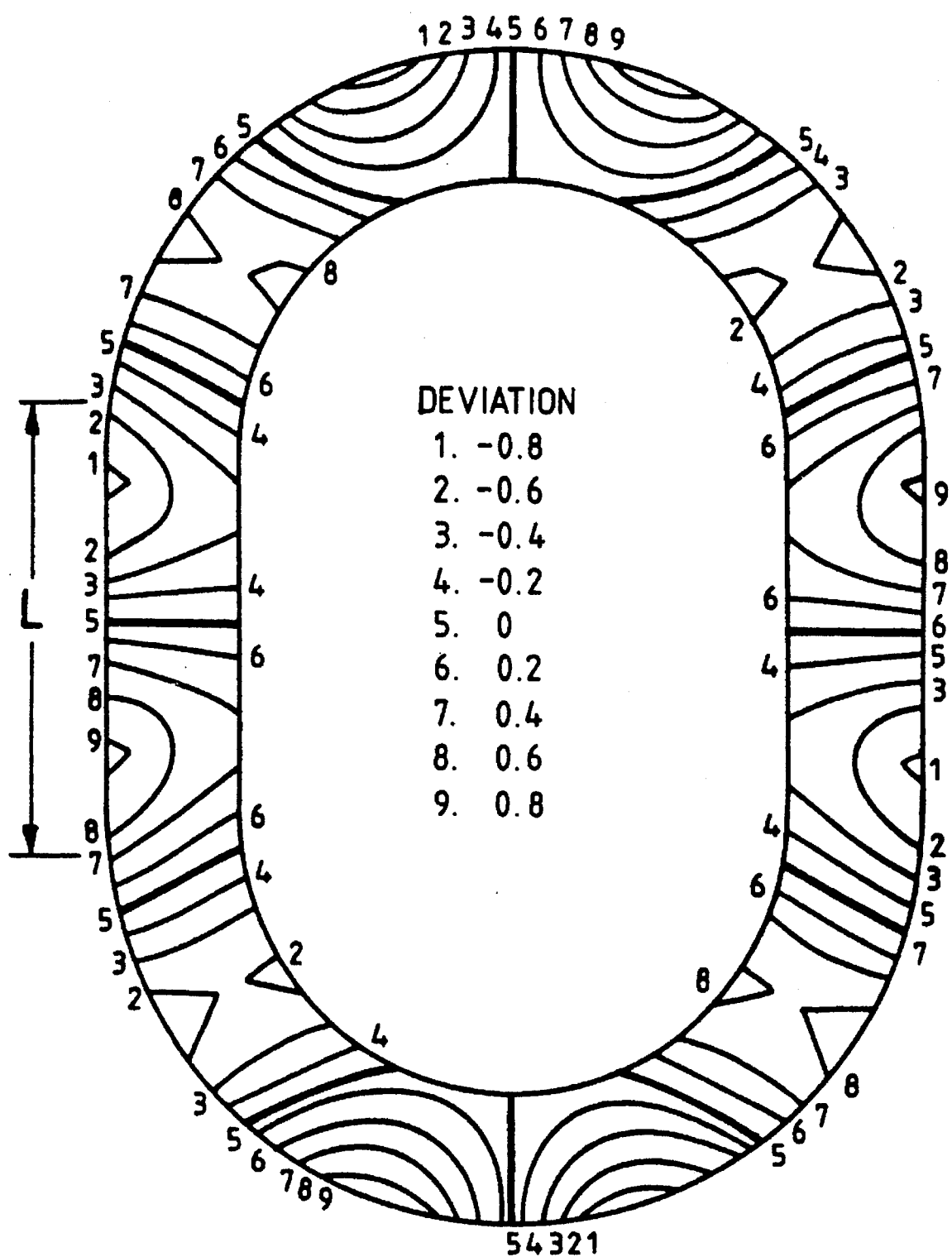
FIGS. 2 and 3 show the vibration modes of the FIG. 1 motor.
Figure 3:
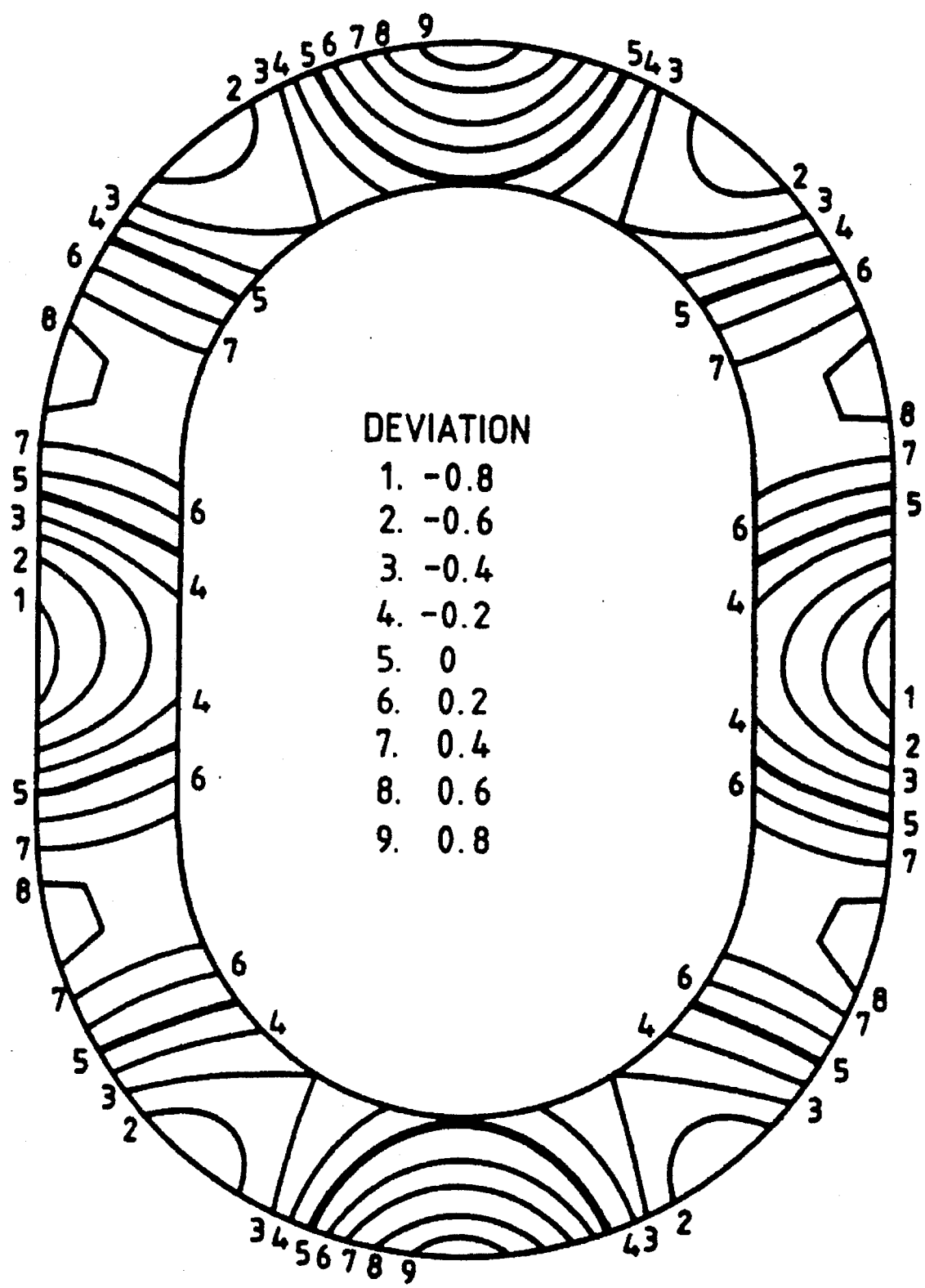
Figure 4A:
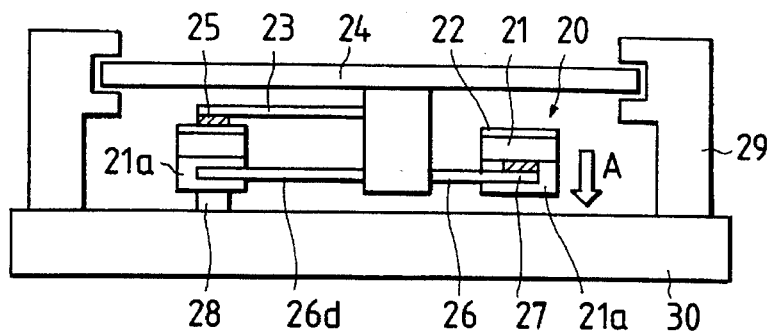
FIGS. 4A and 4B are a cross-sectional view and a plan view, respectively, of a linear motor into which the present invention can be effectively embodied.
Figure 4B:
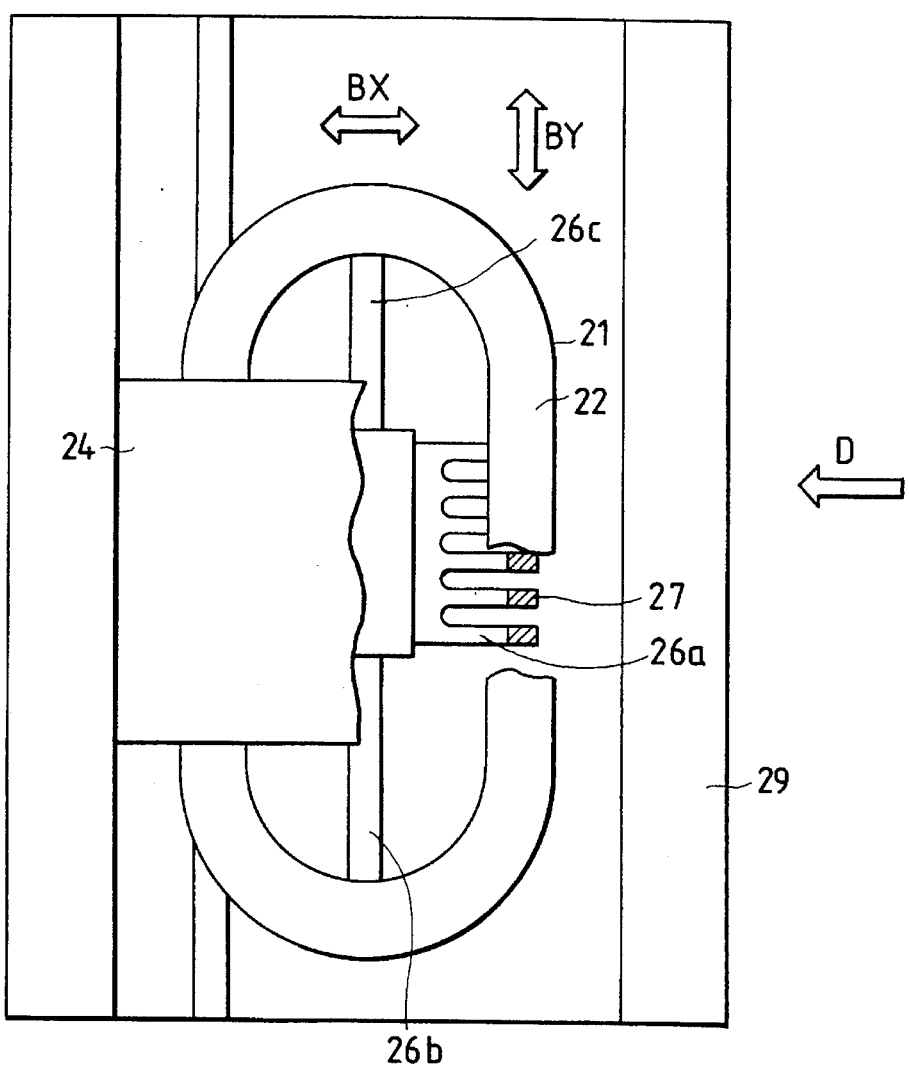

FIG. 1 shows an embodiment of a vibration wave driven motor which is used in a bubble jet type printer and to which the present invention is applied, FIG. 1A being a pictorial perspective view of the vibration member of the motor, and FIG. 1B showing the electrode pattern of the piezo-electric element thereof adapted to form a travelling vibration wave of the 6th-order, and FIGS. 2 and 3 show the vibration modes of the two standing waves thereof. FIG. 4 shows the construction of the essential portions of a bubble jet type printer utilizing the motor of FIGS. 1–3 as a drive source.

In FIG. 4, the reference numeral 20 designates a vibration member comprising a resilient member 21 of an elliptical annular shape having straight portions and arcuate portions and a piezo-electric element 22 as an electro-mechanical energy conversion element. The resilient member 21 has a projection 21a formed on the sliding surface thereof, and by the application of an AC electric field to the piezo-electric element 22 joined to the upper surface thereof, a travelling vibration wave is formed in the resilient member 21. The reference numeral 28 denotes a rail-like stator which is in frictional contact with the resilient member 21 and which is fixed to a bottom plate 30 fixed to a portion of the printer and is brought into contact with the resilient member 21 by a pressing spring 23 with a vibration insulating material 25 (for example, felt) interposed therebetween. The reference numeral 26 designates a comb-tooth-like movement stopper of which the comb-tooth portion 26a is inserted in slits (not shown) in the straight portions of the resilient member 21 which are not in contact with the rail-like stator 28. The resilient member 21 is supported by the comb-tooth portion 26a through felt 27 disposed on the bottom of said slits.

The resilient member 21 is supported on the supporting table 24 of the printing carriage of the printer through the movement stopper 26, the pressing spring 23, etc., and the supporting table 24 is supported by a restraining member 29 for restraining the displacement in any other direction than a direction $B_Y$ which is a predetermined direction of movement.

When AC signals having an electrical phase difference therebetween are applied from a driving circuit, not shown, to the electrodes $22a_1$, $22a_2$, $22b_1$ and $22b_2$ of the piezo-electric element 22 and a travelling vibration wave is formed in the resilient member 21, the resilient member 21 is moved on the rail-like stator 28 by the frictional force between the rail-like stator 28 and the resilient member 21 and along therewith, the supporting table 24 and other members (23, 25, 26, 27) are also moved in the direction $B_Y$ along the guide rail 29 as the restraining member. The frictional driving force produced at that time acts on a portion of the resilient member 21, which deviates from the supporting portion, and thus, a moment acts on the resilient member 21, which tries to deviate in directions $B_X$ and $B_Y$.

The comb-tooth portion 26a of the movement stopper 26 is inserted in the slit portions of the resilient member 21 to restrain the displacement of the resilient member 21 in the direction $B_Y$ and also support the weight of the resilient member 21 through the felt 27. Restraining members 26b and 26c restrain the displacement of the resilient member 21 in the direction $B_X$, and restraining member 26d restrains the displacement of the resilient member 21 in the direction $B_Y$. By virtue of these members 26a–26d, the resilient member 21 is smoothly rectilinearly movable with the supporting table 24 without backlash.

The vibration member 20 in the present embodiment is one in which the piezo-electric element 22 similar to the prior-art one is joined to the back of the track type resilient member 21 formed into an elliptical shape, and the average radius R of the arcuate portions 21r (see FIG. 1A) of the resilient member 21 (i.e., the average value of the radius of the outer peripheral portion and the radius of the inner peripheral portion of the arcuate portions 21r) is 10.5 mm, and the length L of the straight portions 21l of the resilient member 21 is 10.4 mm and the ratio (R/L) therebetween is R/L≈1/1.

The vibration modes of two standing waves formed in the resilient member in this case are shown in FIGS. 2 and 3. As shown therein, in the embodiment of FIGS. 2 and 3 each standing wave has no node line in a radial direction of the vibration member (i.e., no node circle), and has twelve node lines in a circumferential direction of the vibration member. That is the vibration wave is 0-th order in the radial direction and n-th order in the circumferential direction of the vibration member.

The two standing waves formed in the resilient member 20 are all outwardly great in amplitude in the arcuate portions 21r and straight portions 21l of the resilient member 21 and the vibrations thereof are finely uniform, and by superposing the two standing waves one upon the other, there has been formed an ideal travelling vibration wave in the resilient member 21. This is because the nodes of the two standing waves (the lines of deviation zero indicated by thick lines) are inwardly and outwardly astride in the widthwise direction of the resilient member.

Of course, the resonance frequencies of the two standing waves are substantially equal to each other.

Thus, the electrode pattern of the piezo-electric element 22 adhesively secured to the resilient member 21 can be simplified as shown in FIG. 1B.

Figure 5:
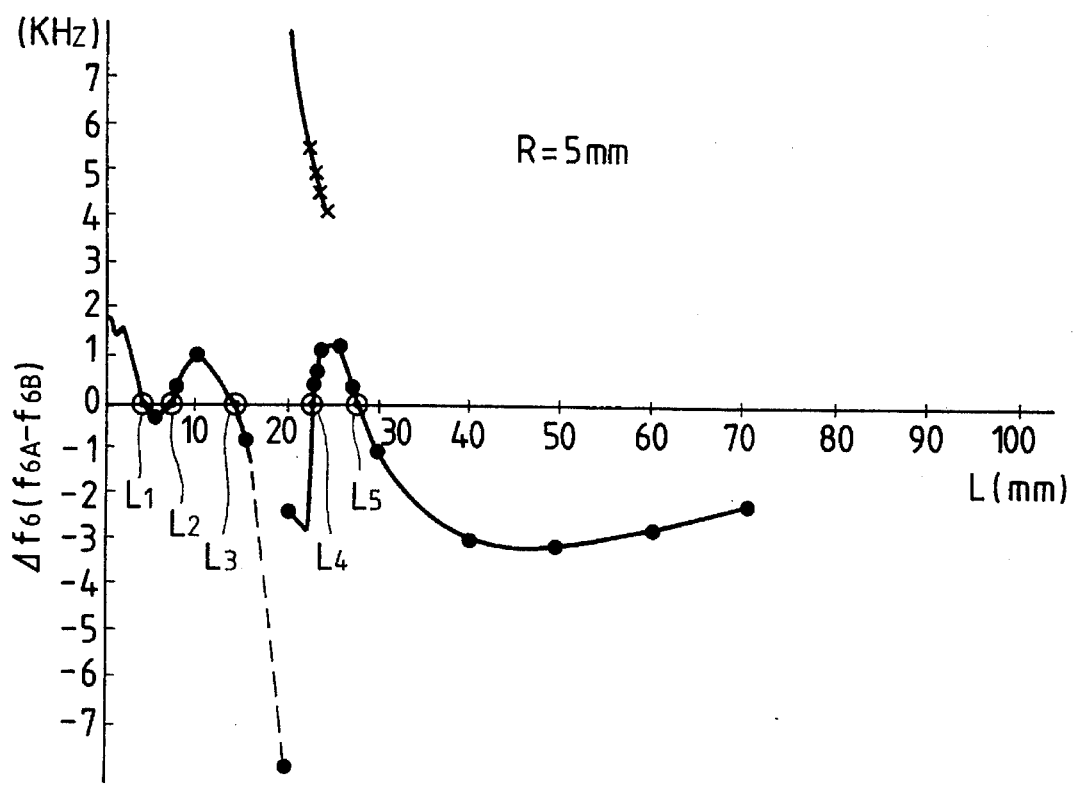
FIGS. 5 and 6 are graphs showing the resonance frequency difference when the average radius of the arcuate portions of the resilient member is 5 mm and the length of the straight portions of the resilient member is varied.

FIG. 5 is a graph showing a variation in the difference $\Delta f_6$ between the resonance frequencies of the two standing waves (6th-order mode) when the average radius of the arcuate portions 21r of the resilient member 21 is fixed at 5 mm and the length L of the straight portions 21l is lengthened from 0 mm as a parameter (in this case, the resilient member is of a circular shape having a radius of 5 mm).

If the length L of the straight portions 21l of the resilient member 21 is made long, there are several points at which the curve of the resonance frequency difference $\Delta f_6$ is $\Delta f_6=0$ ($L_1$–$L_4$). These points concentrate at locations whereat the length L is short, and if the length L becomes long, there will be not point at which $\Delta f_6=0$.

Figure 7A:
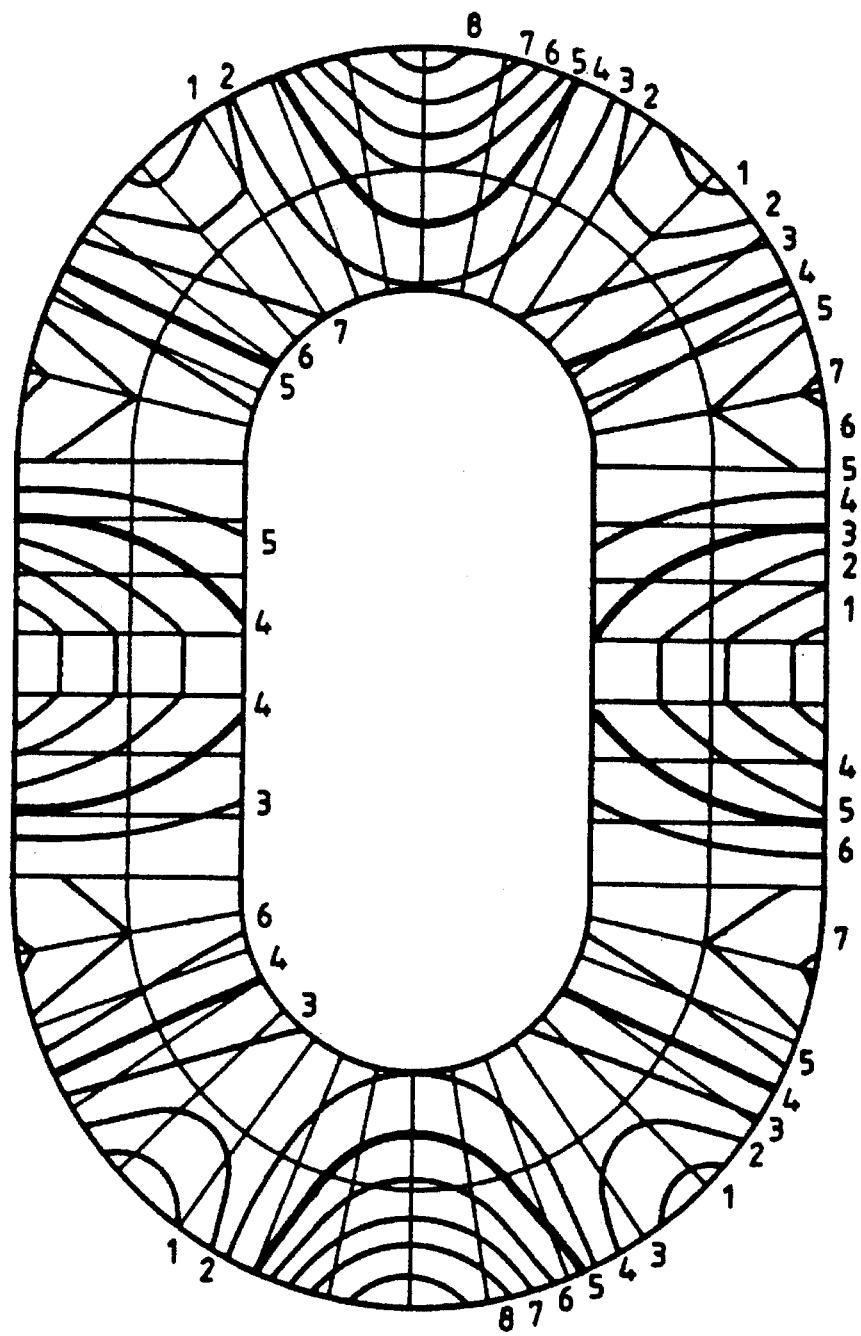
FIGS. 7A, 7B and 7C show the variation in the vibration mode.
Figure 7B:
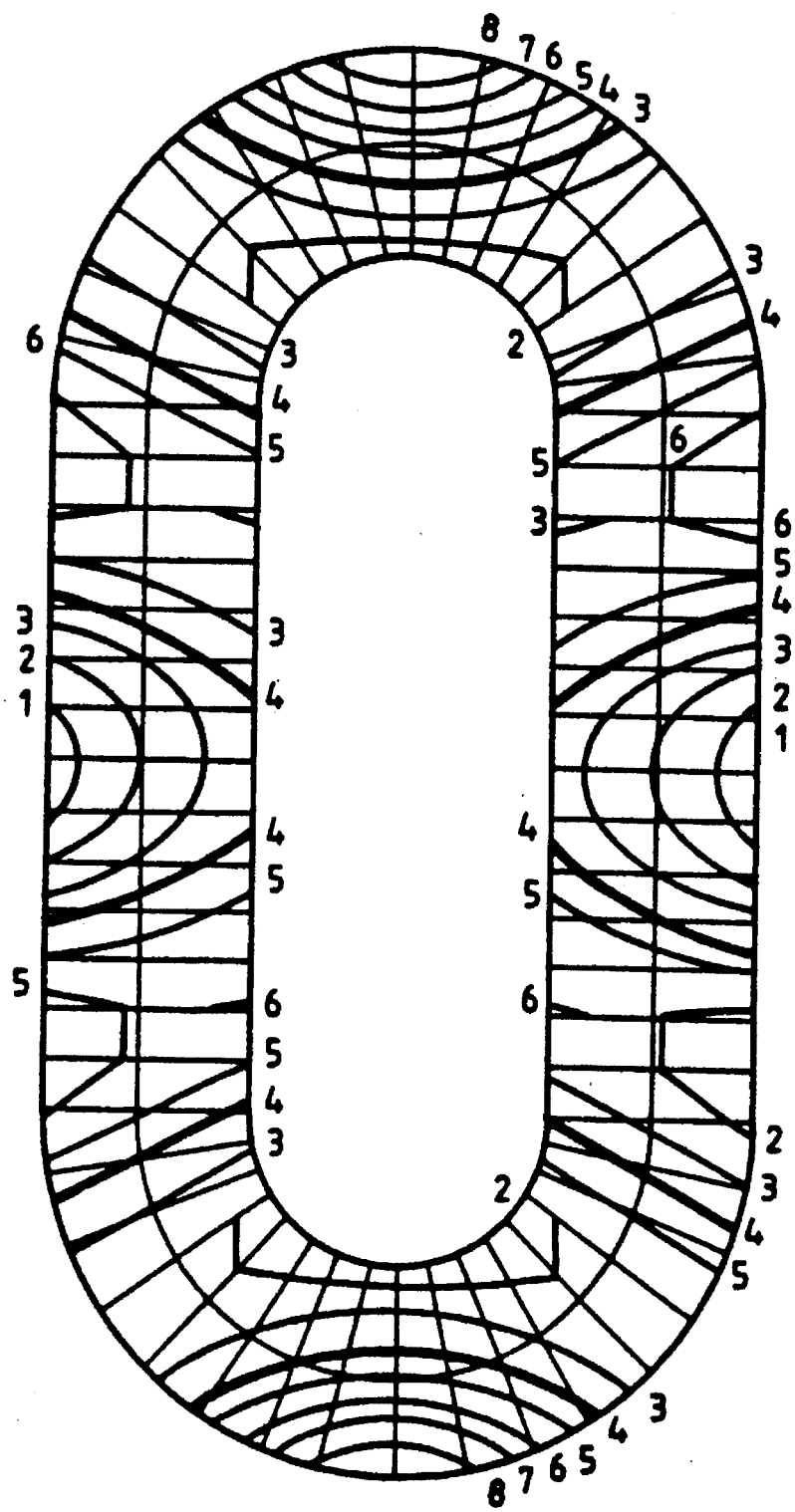
Figure 7C:
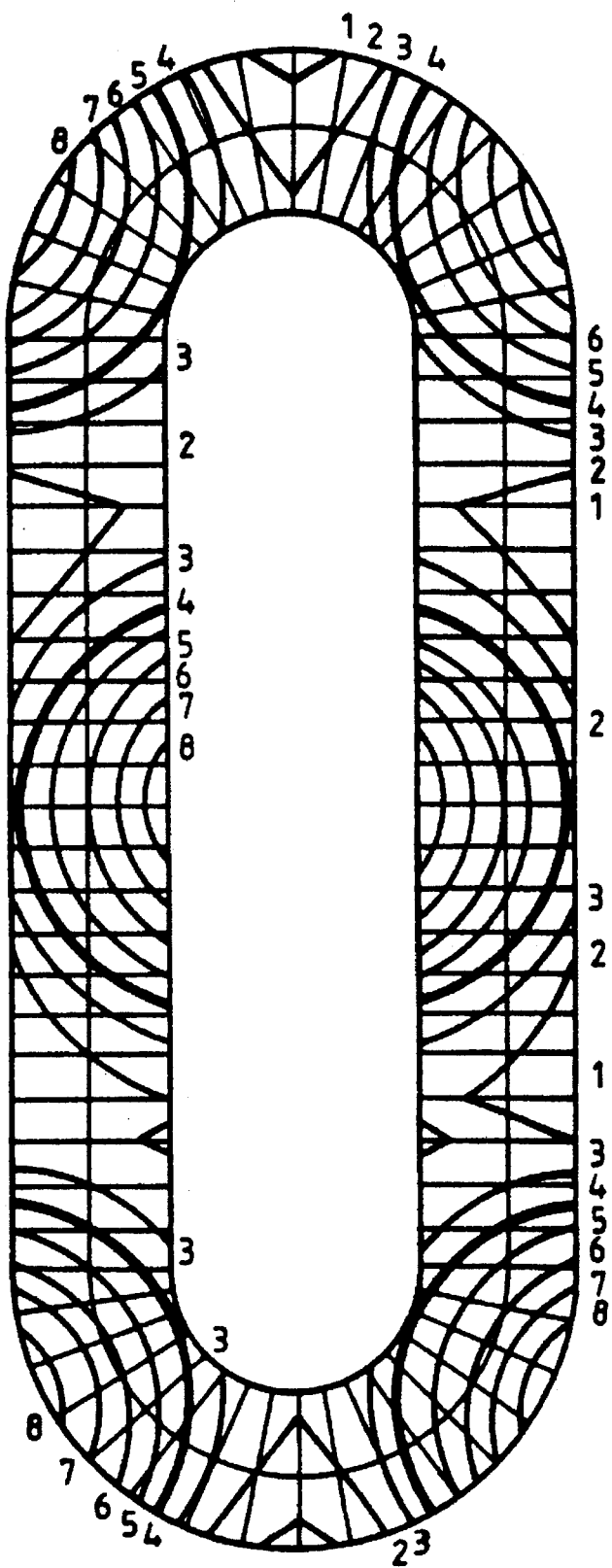

On the other hand, the vibration modes at the points $L_2$, $L_3$ and $L_4$ whereat $\Delta f_6=0$ are such that as shown in FIGS. 7A–7C, the longer becomes the length L, that is, the smaller becomes the value of R/L, the greater becomes torsion, or the direction of torsion tends to become more inconstant.

FIG. 7A shows the vibration mode in the case of the present embodiment at a point whereat L=$L_2$ and R/L=1/1.4. In this case, amplitudes formed in the resilient member are all outwardly great and accordingly, the directions of torsion are all the same, but the torsion is not so great.

FIG. 7B shows a point at which L=$L_3$ (14 mm) and R/L=1/2.8, and FIG. 7C shows a point at which L=$L_4$ and R/L=1/4.4. In the case of FIG. 7C, it is clear that the crests and valleys of the standing waves are divisionally formed on the inner side and the outer side, and in FIG. 7B, although not so clear as in FIG. 7C, the crests and valleys tend to be divisionally formed on the inner side and the outer side.

Figure 6:
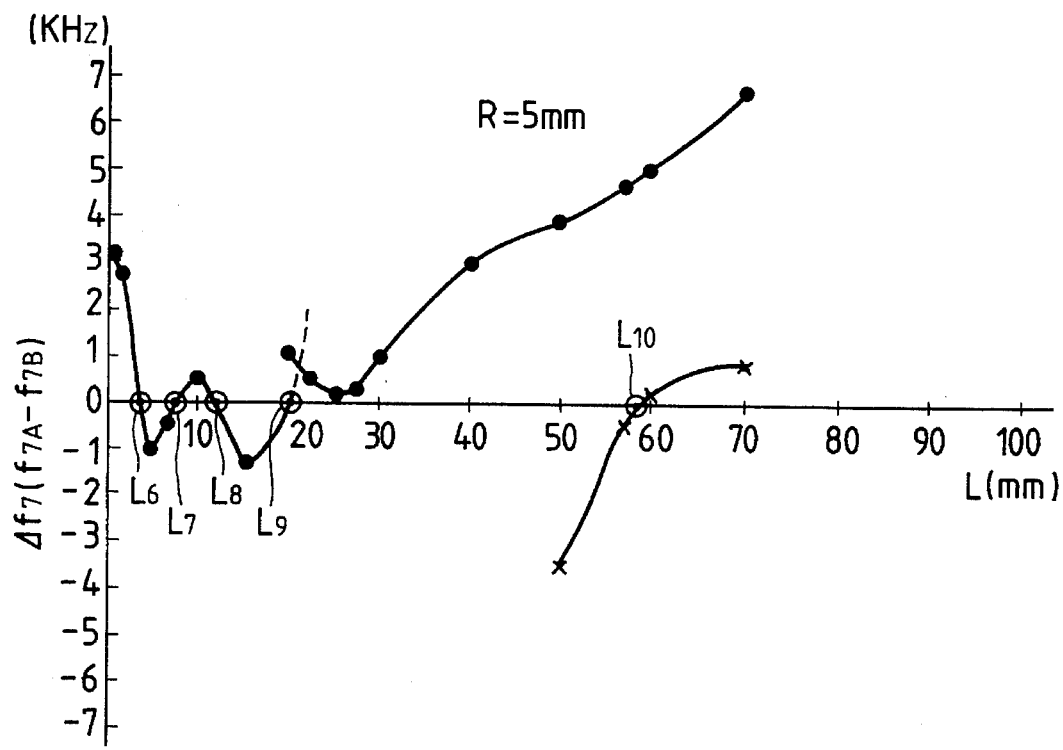
Figure 10:
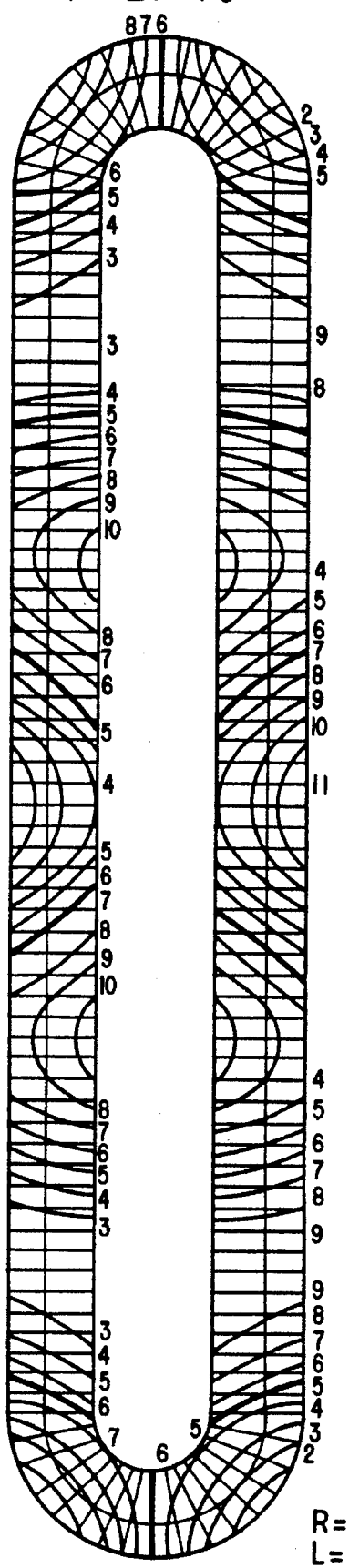
FIGS. 10 and 11 show the vibration modes when R=5 mm and L=58 mm.
Figure 11:
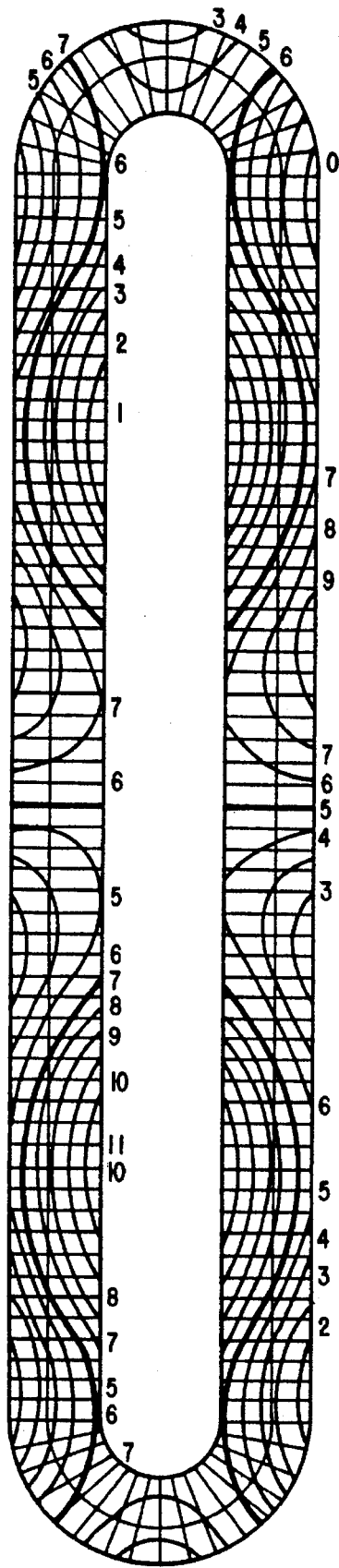
Figure 12:
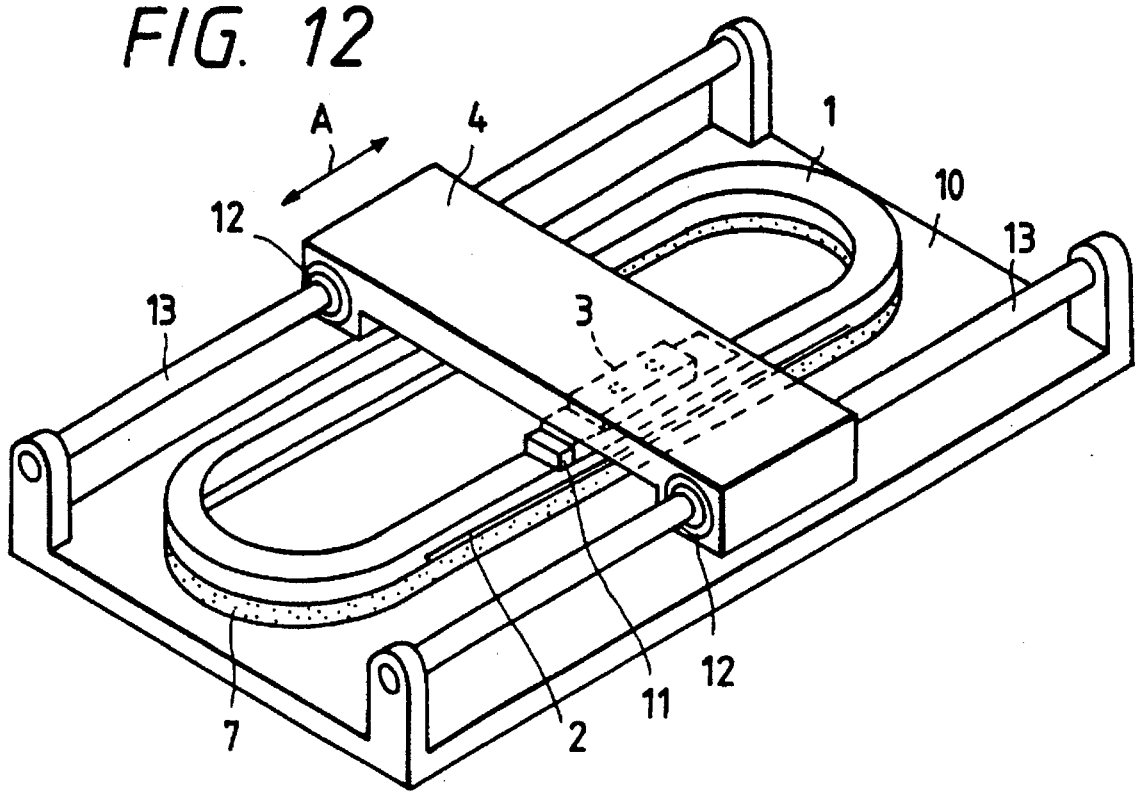
FIG. 12 is a perspective view of a vibration wave driven linear motor using a vibration wave driven motor according to the prior art.
Figure 13:
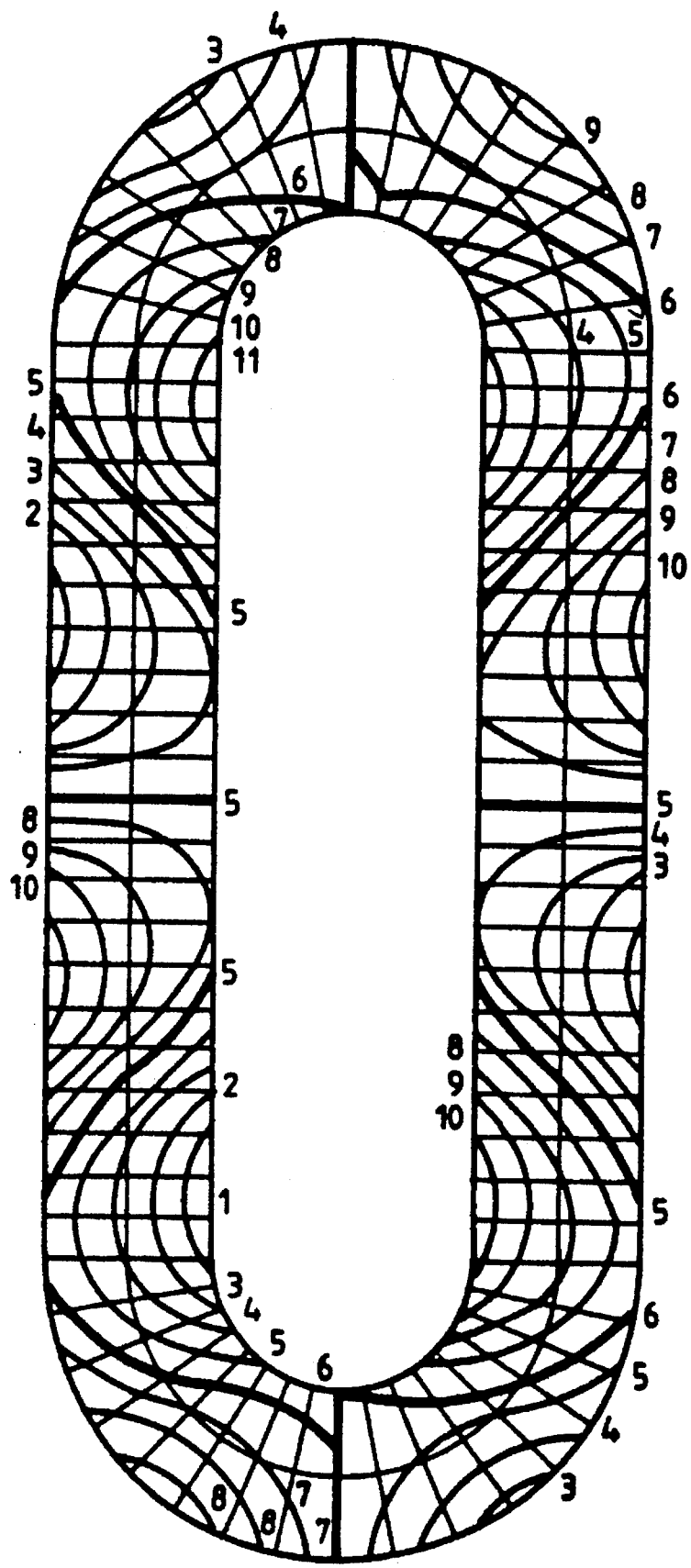
FIGS. 13 and 14 show the vibration mode of the vibration wave driven motor according to the prior art.
Figure 14:
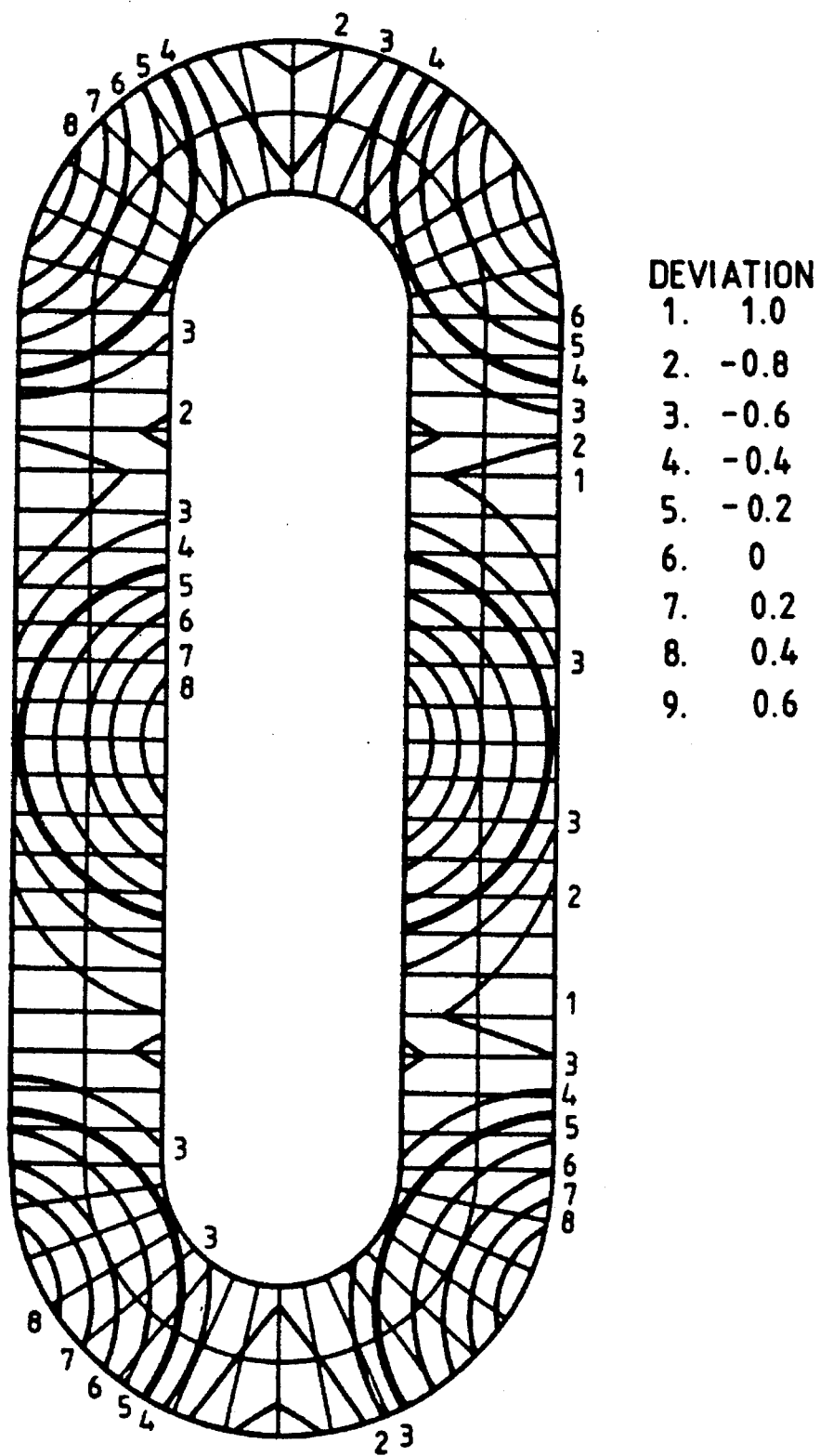
Figure 15:
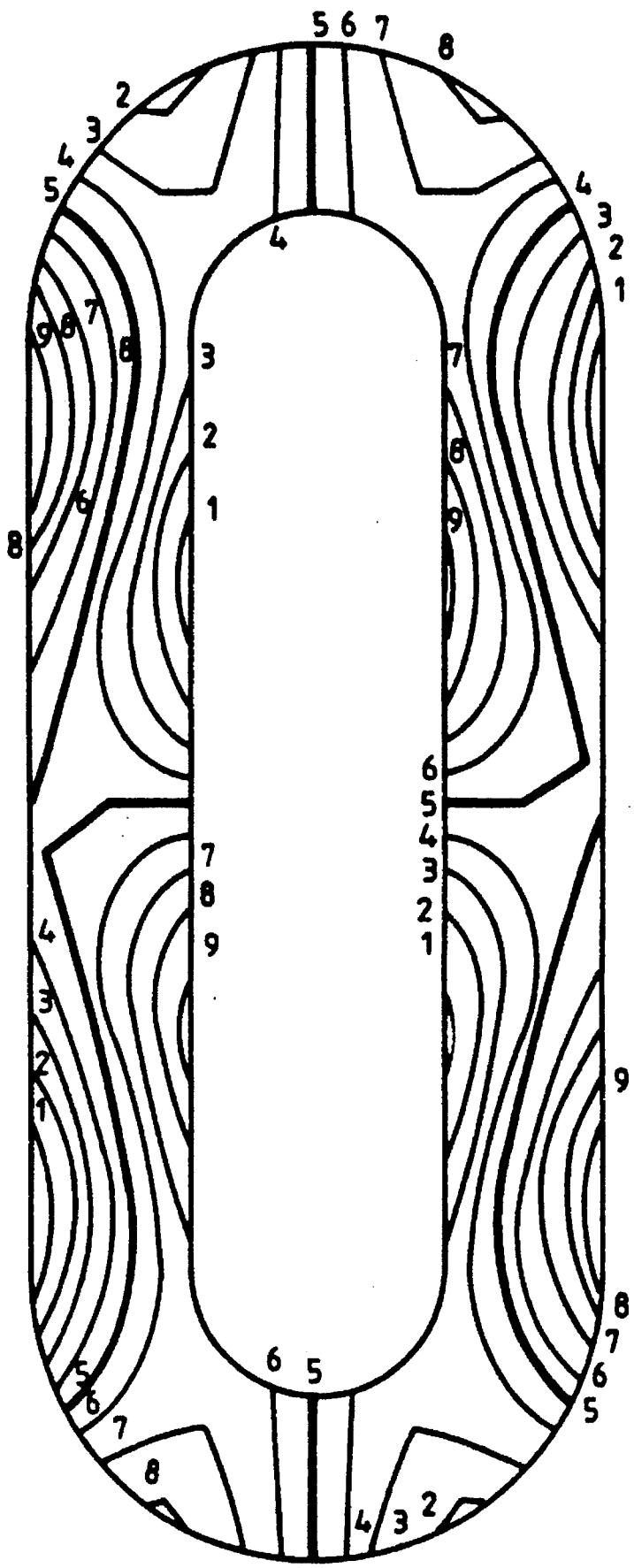
FIGS. 15 and 16 show other vibration modes.
Figure 16:
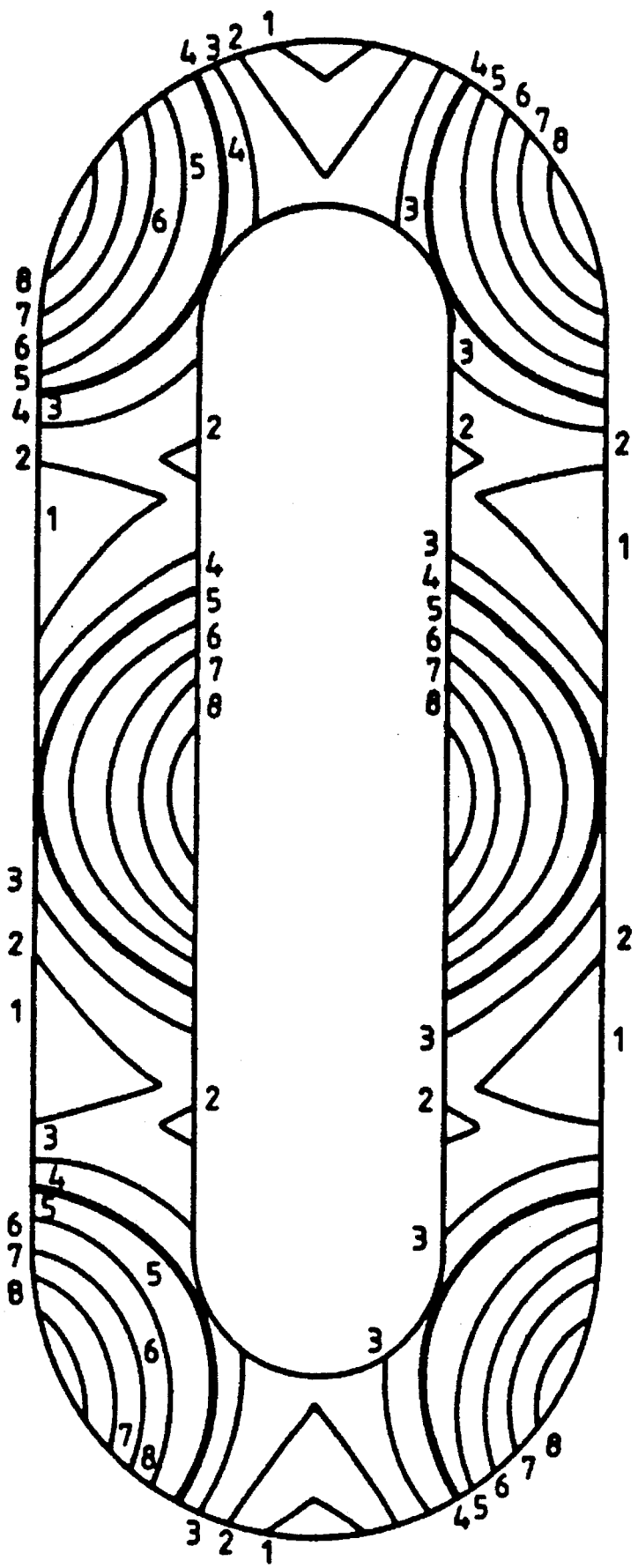
Figure 17:
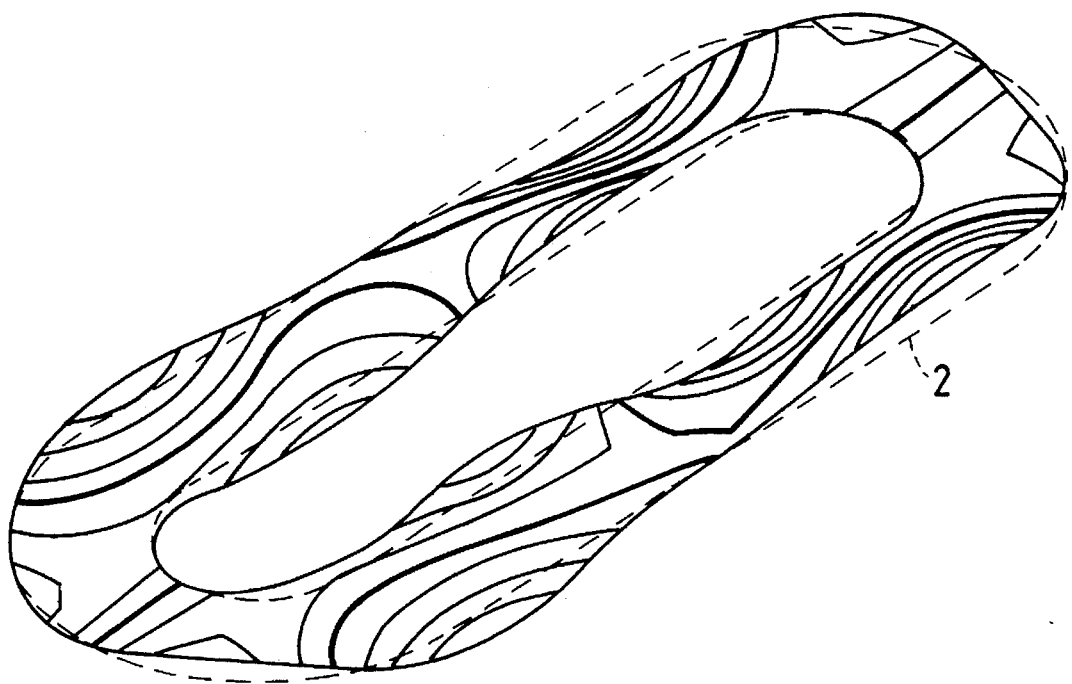
FIGS. 17 and 18 are perspective views showing the states of vibration in the vibration modes of FIGS. 15 and 16.
Figure 18:
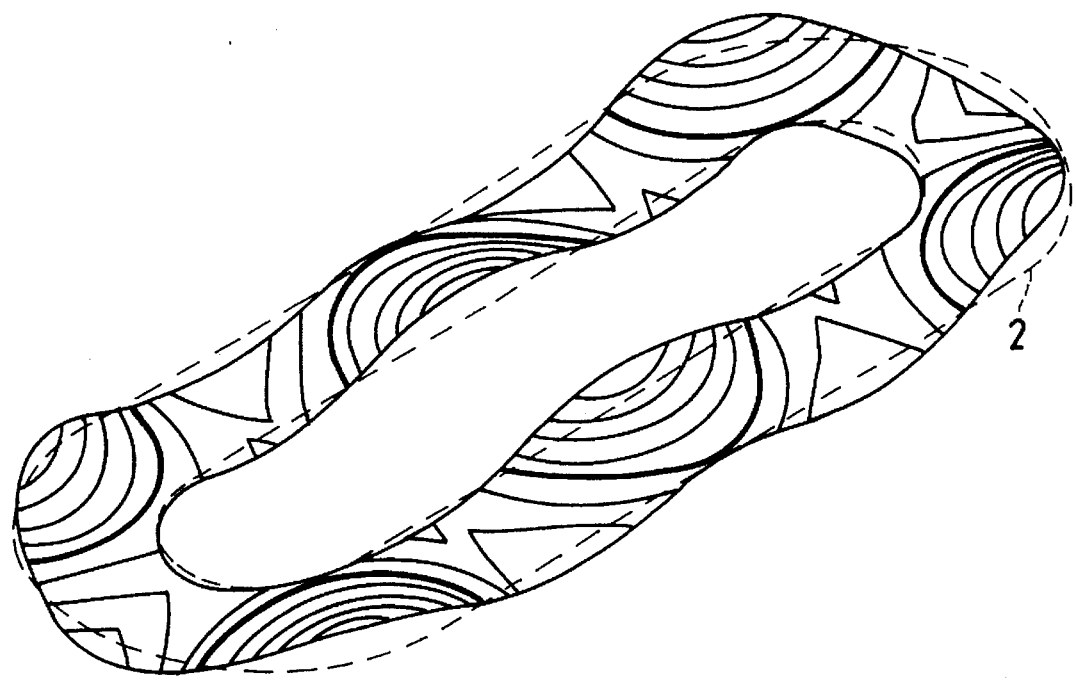
Figure 19:
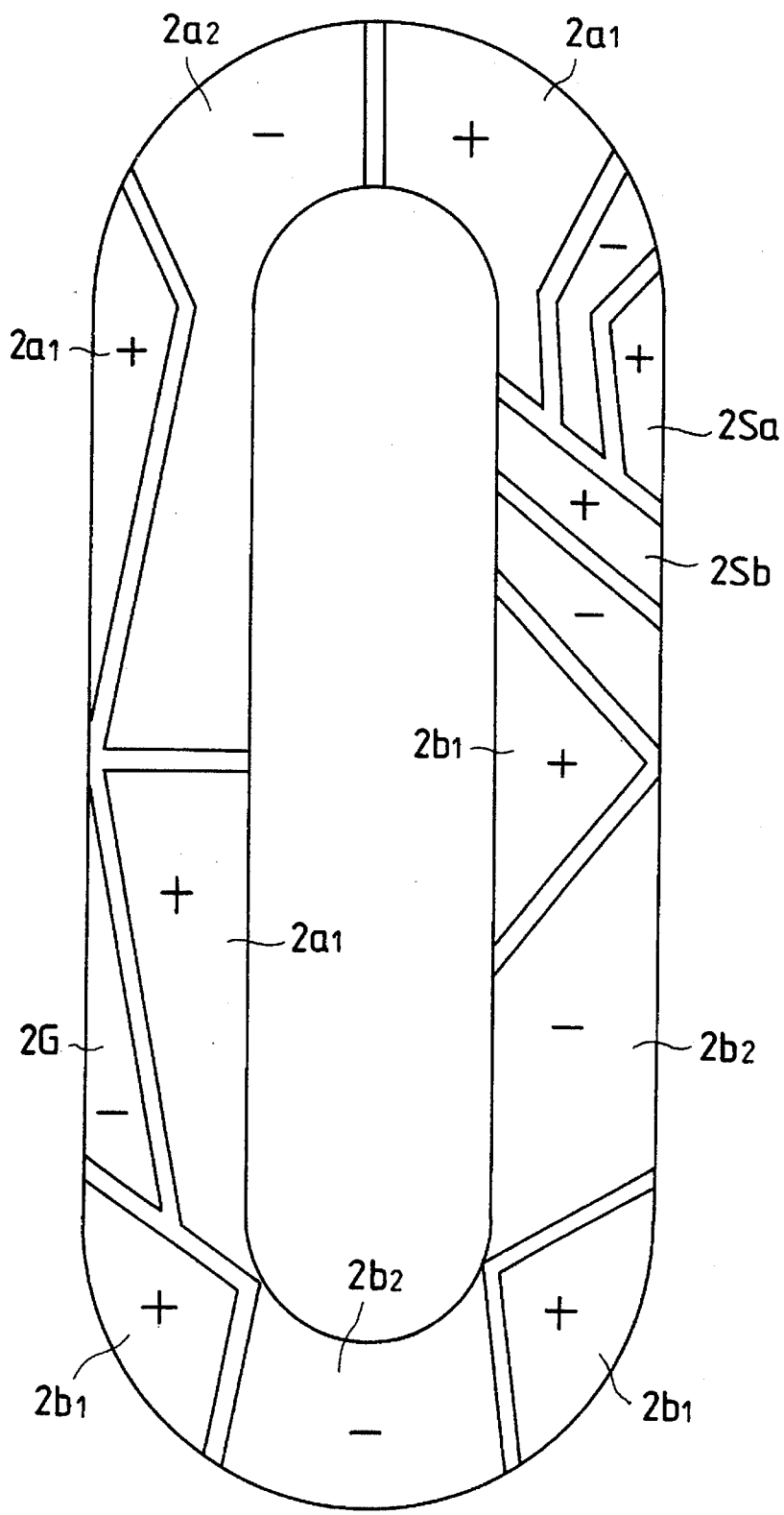
FIG. 19 shows the electrode pattern of the piezo-electric element.

FIG. 6 is a graph showing the state of the resonance frequency difference $\Delta f_7$ of the 7th-order mode when R=5 mm and L is varied, and points at which $\Delta f_7=0$ tend to become many in a range in which L is small, but also exist when L=58 mm. However, the vibration mode when L=58 mm becomes a mode in which, as shown in FIGS. 10 and 11, the torsion component is great and the direction of the torsion is not always one, but the inner and outer amplitudes become alternately great in the straight portions. Accordingly, this mode is unsuitable as the vibration member of the vibration wave driven motor, and what can be actually used as the vibration member is only the shape at a point whereat L=20 mm or less and $\Delta f=0$.

Figure 8:
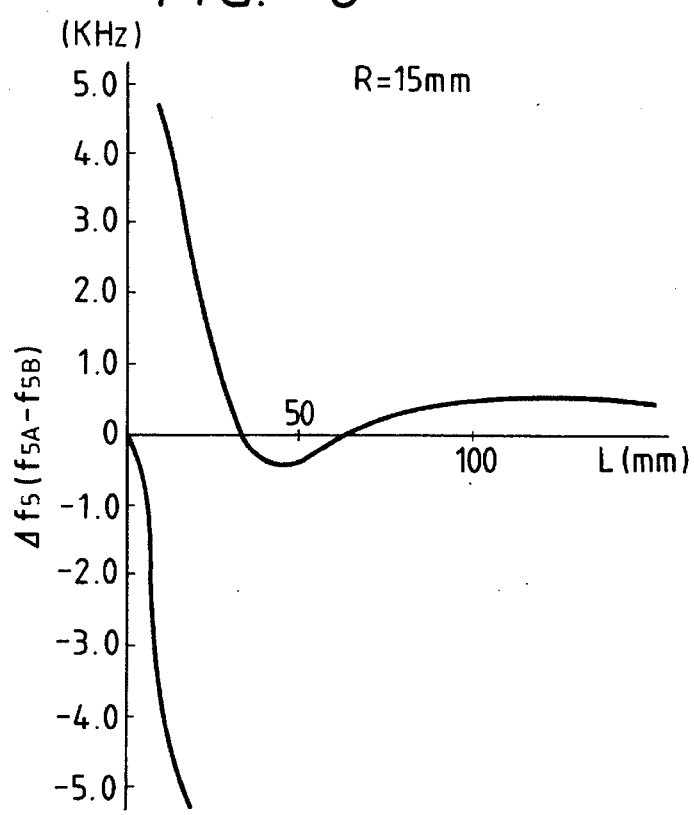
FIGS. 8 and 9 are graphs showing the resonance frequency difference when the average radius of the arcuate portions of the resilient member is 15 mm and the length of the straight portions of the resilient member is varied.
Figure 9:
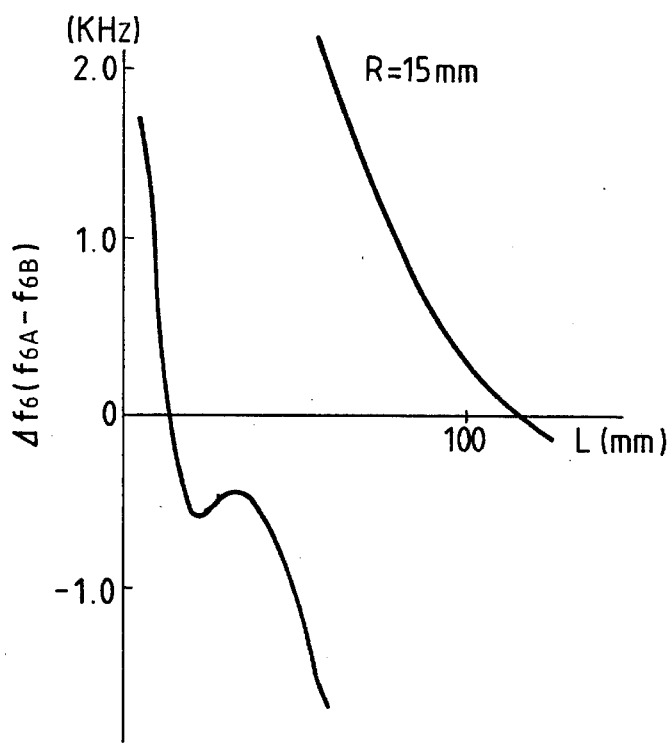

FIGS. 8 and 9 show variations in the resonance frequency differences $\Delta f_5$ and $\Delta f_6$ in the 5th-order mode and the 6th-order mode, respectively, when R=15 mm and L is varied. Again in this case, there is the tendency that points at which Δf=0 exist where L is short, and although the mode graph is not shown, where L is long, there is the tendency that even if points at which Δf=0 exist, the torsion component becomes great as previously described.

Figure 20:
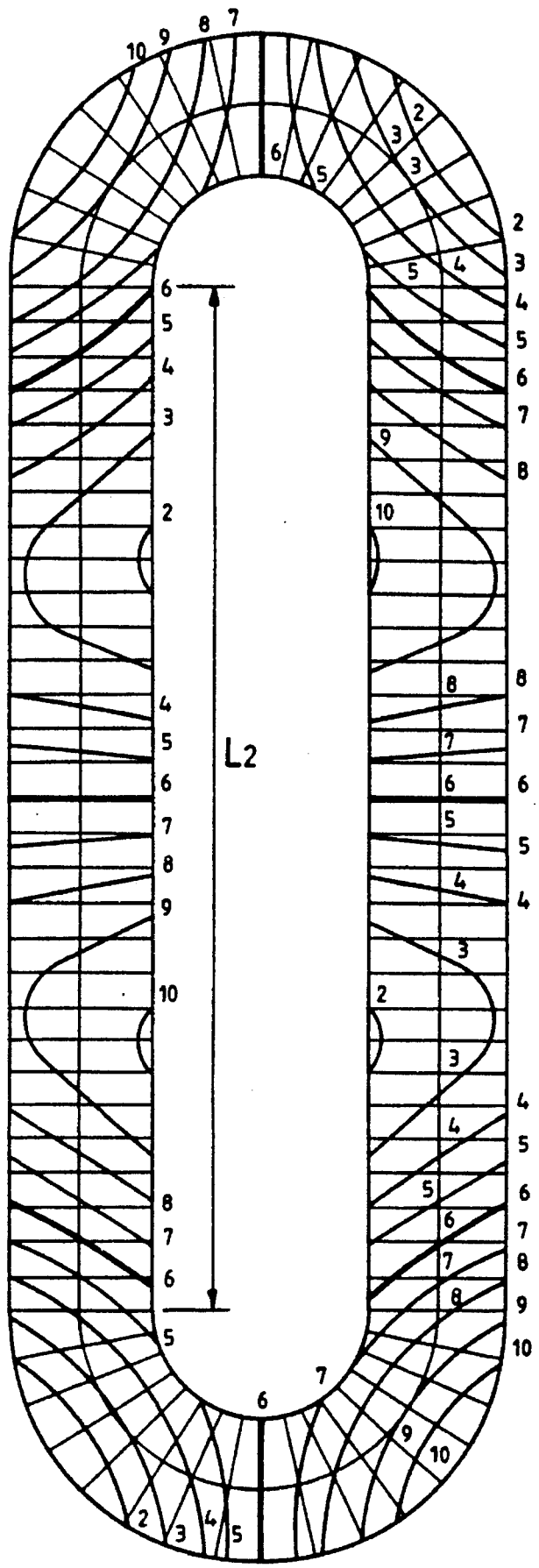
FIG. 20 shows the vibration mode of another embodiment of the present invention.

All of the above-described embodiment are such that the amplitude becomes greater toward the outer side of the resilient member, but alternatively, as shown in FIG. 20, in the straight portions used as the sliding portions, the amplitude can be made greater toward the inner side of the resilient member.

As has hitherto been described, according to the present invention, there can be provided a vibration wave driven motor in which the ratio of the average radius R of the arcuate portions of a track-shaped resilient member to the length L of the straight portions of the resilient member is set to R/L≧1/4, whereby there is obtained a vibration mode in which the difference between the resonance frequencies of two standing waves formed in the resilient member is small and torsion is small or the direction of the torsion is uniform and the fine travelling vibration wave can be excited efficiently, and the electrode pattern structure of an electro-mechanical energy conversion element such as piezo-electric element attached to the resilient member can be simplified without the efficiency of the motor being reduced.

We claim:

1. A vibration wave driven motor comprising:

a contact member; and an elliptical annular-shaped vibration member comprising arcuate portions and straight portions, and electro-mechanical energy conversion means, including an electro-mechanical energy conversion element pattern disposed along a circumference of the elliptical annular-shaped vibration member, for generating a travelling vibration wave therein in response to an applied electrical signal, the travelling vibration wave having a vibration mode that is n-th order in a circumferential direction of the vibration member and 0-th order in a radial direction thereof, wherein an average radius of one of said arcuate portions is R, a length of one of said straight portions is L, and a ratio of R/L is 1/4 or greater, such that a position of a peak amplitude of the vibration wave generated in the linear portion L of said vibration member occurs only at a radially inner or outer circumferential side of said vibration member, and wherein the vibration wave creates relative movement between the vibration member and the contact member.

2. A vibration wave driven motor according to claim 1, wherein said vibration member includes two groups of electro-mechanical energy conversion elements which receive the electrical signal and generate a vibration in response to the electrical signal.

3. A vibration wave driven motor according to claim 1, wherein said vibration member has a plurality of projections provided traversing in the direction of travel of the travelling vibration wave, the projections being frictionally engaged with said contact member.

4. A vibration wave driven motor according to claim 2, wherein each of said groups of conversion elements has a plurality of segments which alternately differ in polarity.

5. A vibration wave driven motor according to claim 2, wherein said groups of conversion elements are positionally deviated from each other.

6. A vibration wave driven apparatus comprising:

a fixed contact member; and a movable elliptical annular-shaped vibration member comprising arcuate portions and straight portions, and electro-mechanical energy conversion means, including an electro-mechanical energy conversion element pattern disposed along a circumference of the elliptical annular-shaped vibration member, for generating a travelling vibration wave therein in response to an applied electrical signal, the travelling vibration wave having a vibration mode that is n-th order in a circumferential direction of the vibration member and 0-th order in a radial direction thereof, wherein an average radius of one of said arcuate portions is R, a length of one of said straight portions is L, and a ratio of R/L is 1/4 or greater, such that a position of a peak amplitude of the vibration wave generated in the linear portion L of said vibration member occurs only at a radially inner or outer circumferential side of said vibration member, and wherein the vibration wave creates relative movement between the vibration member and the contact member.

7. A vibration wave driven printer comprising:

a contact member; and an elliptical annular-shaped vibration member comprising arcuate portions and straight portions, and electro-mechanical energy conversion means, including an electro-mechanical energy conversion element pattern disposed along a circumference of the elliptical annular-shaped vibration member, for generating a travelling vibration wave therein in response to an applied electrical signal, the travelling vibration wave having a vibration mode that is n-th order in a circumferential direction of the vibration member and 0-th order in a radial direction thereof, wherein an average radius of one of said arcuate portions is R, a length of one of said straight portions is L, and a ratio of R/L is 1/4 or greater, such that a position of a peak amplitude of the vibration wave generation in the linear portion L of said vibration member occurs only at a radially inner or outer circumferential side of said vibration member, and wherein the vibration wave creates relative movement between the vibration member and the contact member.

8. A vibration wave driven printer according to claim 7, further comprising:

a supporting table for supporting a printing head thereon, said supporting table being engaged with said vibration member; and a guide member permitting the movement of said supporting table in a direction along the direction of said relative movement.

9. A vibration wave driven apparatus comprising:

a contact member; and an elliptical annular-shaped vibration member comprising arcuate portions and straight portions, and electro-mechanical energy conversion means, including an electro-mechanical energy conversion element pattern disposed along a circumference of the elliptical annular-shaped vibration member, for generating a travelling vibration wave therein in response to an applied electrical signal, the travelling vibration wave having a vibration mode that is n-th order in a circumferential direction of the vibration member and 0-th order in a radial direction thereof, wherein an average radius of one of said arcuate portions is R, a length of one of said straight portions is L, and a ratio of R/L is 1/4 or greater, such that a position of a peak amplitude of the vibration wave generated in the linear portion L of said vibration member occurs only at a radially inner or outer circumferential side of said vibration member, and wherein the vibration wave creates relative movement between the vibration member and the contact member.

10. A vibration wave driven apparatus comprising:

a ring-shaped vibration member having straight portions and arcuate portions; and electro-mechanical energy conversion means, including an electro-mechanical energy conversion element pattern disposed along a circumference of said ring-shaped vibration member, for generating a travelling vibration wave in said vibration member in response to an applied periodic electrical signal, the travelling vibration wave having a vibration mode that is n-th order in a circumferential direction of the ring-shaped vibration member and 0-th order in a radial direction thereof, wherein an average radius of one of said arcuate portions of the vibration member is R, a length of one of said straight portions is L, and a ratio of R/L is 1/4 or greater, such that a position of a peak amplitude of the vibration wave generated in the linear portion L of said vibration member occurs only at a radially inner or outer circumferential side of said vibration member, and wherein said vibration wave creates relative movement between the vibration member and a contact member which is in contact with the vibration member.

11. A vibration member for a vibration wave driven motor, comprising:

a ring-shaped resilient member comprising arcuate portions and straight portions, wherein an average radius of one of said arcuate portions of said resilient member is R, a length of one of said straight portions is L, and a ratio of R/L is 1/4 or greater; and electro-mechanical energy conversion means, including an electro-mechanical energy conversion element pattern disposed along a circumference of said ring-shaped resilient member, for generating a travelling vibration wave in said resilient member in response to an applied electrical signal, the travelling vibration wave having a vibration mode that is n-th order in a circumferential direction of the ring-shaped resilient member and is 0-th order in a radial direction thereof, such that a position of a peak amplitude of the vibration wave generated in the linear portion L of said vibration member occurs only at a radially inner or outer circumferential side of said vibration member.

12. A vibration wave driven apparatus, comprising:

a loop-shaped vibration member including a straight portion and an arcuate portion; and electro-mechanical energy conversion means, including an electro-mechanical energy conversion element pattern disposed along a circumference of said loop-shaped vibration member, for generating a vibration wave in said vibration member in response to an applied periodic electrical signal, the vibration wave having a vibration mode that is n-th order in a circumferential direction of the loop-shaped vibration member and 0-th order in a radial direction thereof, wherein an average radius of said arcuate portion of the vibration member is R, a length of said straight portion is L, and a ratio of R/L is 1/4 or greater, such that a position of a peak amplitude of the vibration wave generated in the linear portion L of said vibration member occurs only at a radially inner or outer circumferential side of said vibration member, and wherein said vibration wave creates relative movement between said vibration member and a contact member which is in contact with the vibration member.

13. A vibrating device for a vibration wave driven actuator, comprising:

a loop-shaped vibration member comprising a linear portion and an arcuate portion, and electro-mechanical energy conversion means, including an electro-mechanical energy conversion element pattern disposed along a circumference of the elliptical annular-shaped vibration member, for generating a vibration wave therein in response to an applied electrical signal, the vibration wave having a vibration mode that is 0-th order in a radial direction of the loop-shaped vibration member, wherein an average radius of said arcuate portion is R, a length of said linear portion is L, and a ratio of R/L is 1/4 or greater, such that a position of a peak amplitude of the vibration wave generated in the linear portion L of said vibration member occurs only at a radially inner or outer circumferential side of said vibration member.

14. A vibration wave driven system, comprising:

a loop-shaped vibration member comprising a linear portion and an arcuate portion, and electro-mechanical energy conversion means, including an electro-mechanical energy conversion element pattern disposed along a circumference of the elliptical annular-shaped vibration member, for generating a vibration wave therein in response to an applied electrical signal, the vibration wave having a vibration mode that is 0-th order in a radial direction of the loop-shaped vibration member, wherein an average radius of said arcuate portion is R, a length of said linear portion is L, and a ratio of R/L is 1/4 or greater, such that a position of a peak amplitude of the vibration wave generated in the linear portion L of said vibration member occurs only at a radially inner or outer circumferential side of said vibration member; and a contact member arranged to receive the vibration wave, whereby the vibration wave creates relative movement between the vibration member and the contact member.

15. A vibration wave driven system according to claim 14, wherein said vibration member forms a supporting element for a carriage of a printer.

16. A vibration wave driven printer as recited in claim 7, wherein said electro-mechanical energy conversion element pattern comprises a nonsymmetrical arrangement of electro-mechanical energy conversion portions.

17. A vibration wave driven apparatus as recited in claim 9, wherein said electro-mechanical energy conversion element pattern comprises a nonsymmetrical arrangement of electro-mechanical energy conversion portions.

18. A vibration wave driven apparatus as recited in claim 10, wherein said electro-mechanical energy conversion element pattern comprises a nonsymmetrical arrangement of electro-mechanical energy conversion portions.

19. A vibration member for a vibration wave driven motor as recited in claim 11, wherein said electro-mechanical energy conversion element pattern comprises a nonsymmetrical arrangement of electro-mechanical energy conversion portions.

20. A vibration wave driven apparatus as recited in claim 12, wherein said electro-mechanical energy conversion element pattern comprises a nonsymmetrical arrangement of electro-mechanical energy conversion portions.

21. A vibration device as recited in claim 13, wherein said electro-mechanical energy conversion element pattern comprises a nonsymmetrical arrangement of electro-mechanical energy conversion portions.

22. A vibration wave driven system as recited in claim 14, wherein said electro-mechanical energy conversion element pattern comprises a nonsymmetrical arrangement of electro-mechanical energy conversion portions.

23. A vibration wave driven motor as recited in claim 1, wherein the ratio R/L is 1/2.8 or greater.

24. A vibration wave driven apparatus as recited in claim 6, wherein the ratio R/L is 1/2.8 or greater.

25. A vibration wave driven printer as recited in claim 7, wherein the ratio R/L is 1/2.8 or greater.

26. A vibration wave driven apparatus as recited in claim 9, wherein the ratio R/L is 1/2.8 or greater.

27. A vibration wave driven apparatus as recited in claim 10, wherein the ratio R/L is 1/2.8 or greater.

28. A vibration member for a vibration wave driven motor as recited in claim 11, wherein the ratio R/L is 1/2.8 or greater.

29. A vibration wave driven apparatus as recited in claim 12, wherein the ratio R/L is 1/2.8 or greater.

30. A vibration device as recited in claim 13, wherein the ratio R/L is 1/2.8 or greater.

31. A vibration wave driven system as recited in claim 14, wherein the ratio R/L is 1/2.8 or greater.

32. A vibration wave driven motor as recited in claim 1, wherein said electro-mechanical energy conversion element pattern comprises a nonsymmetrical arrangement of electro-mechanical energy conversion portions.

33. A vibration wave driven apparatus as recited in claim 6, wherein said electro-mechanical energy conversion element pattern comprises a nonsymmetrical arrangement of electro-mechanical energy conversion portions.

* * * * *

UNITED STATES PATENT AND TRADEMARK OFFICE
CERTIFICATE OF CORRECTION

PATENT NO. : 5,583,390
DATED : December 10, 1996
INVENTOR(S) : HIROYUKI SEKI, ET AL.

It is certified that error appears in the above-indentified patent and that said Letters Patent is hereby corrected as shown below:

COLUMN 1:

Line 31, "fields" should read --field--.

COLUMN 2:

Line 54, "and" (first occurrence) should read --an--.

COLUMN 5:

Line 51, "$B_Y$" should read --By--.

COLUMN 6:

Line 5, "is" (first occurrence) should read --is,--.
    Line 34, "not" should read --no--.

Signed and Sealed this

Twentieth Day of May, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,583,390
DATED : December 10, 1996
INVENTOR(S) : HIROYUKI SEKI, ET AL.

It is certified that error appears in the above-indentified patent and that said Letters Patent is hereby corrected as shown below:

COLUMN 7:

Line 7, "embodiment" should read --embodiments--.

COLUMN 8:

Line 37, "generation" should read --generated--.

Signed and Sealed this

Twentieth Day of May, 1997

Attest:

BRUCE LEHMAN

Attesting Officer    Commissioner of Patents and Trademarks